United States Patent [19]
Hall

[11] 3,913,280
[45] *Oct. 21, 1975

[54] POLYCRYSTALLINE DIAMOND COMPOSITES

[75] Inventor: Howard T. Hall, Provo, Utah

[73] Assignee: Megadiamond Corporation, Provo, Utah

[ * ] Notice: The portion of the term of this patent subsequent to June 11, 1991, has been disclaimed.

[22] Filed: Mar. 20, 1974

[21] Appl. No.: 452,881

Related U.S. Application Data

[63] Continuation-in-part of Ser. No. 111,019, Jan. 29, 1971, Pat. No. 3,816,085.

[52] U.S. Cl. ............... 51/307; 51/308; 51/309; 264/125
[51] Int. Cl.² ................. B24D 3/02; C04B 31/16
[58] Field of Search ...... 51/307, 308, 309; 264/125; 423/446

[56] References Cited

UNITED STATES PATENTS

| | | | |
|---|---|---|---|
| 3,141,746 | 7/1964 | De Lai | 51/307 |
| 3,239,321 | 3/1966 | Blainey | 51/307 |
| 3,372,010 | 3/1968 | Parsons | 51/307 |
| 3,574,580 | 4/1971 | Stromberg et al. | 51/307 |
| 3,744,982 | 7/1973 | Bovenkerk et al. | 51/309 |
| 3,816,085 | 6/1974 | Hall | 51/308 |

Primary Examiner—Donald J. Arnold
Attorney, Agent, or Firm—H. Ross Workman; J. Winslow Young

[57] ABSTRACT

A polycrystalline diamond composite and method having diamond to diamond bonds formed between adjacent diamond particles. The composite is produced by mixing diamond particles with a sintering aid and creating direct diamond to diamond bonds under temperature and pressure conditions at which diamond is normally unstable.

8 Claims, 4 Drawing Figures

POLYCRYSTALLINE DIAMOND COMPOSITES

This is a continuation-in-part of my copending application Ser. No. 111,019, filed Jan. 29, 1971 and now U.S. Pat. No. 3,816,085.

BACKGROUND

1. Field of the Invention

The present invention relates to polycrystalline diamond composites having direct diamond to diamond bonds, voids between adjacent diamond particles being substantially filled with at least one nondiamond sintering aid and wherein the bonding reaction occurs under temperature and pressure conditions at which diamond is unstable.

2. The Prior Art

The formation of diamond compacts having diamond to diamond bonds between adjacent diamond particles readily occurs at temperature and pressure conditions lying within the diamond stable region. Such an invention is disclosed by DeLai (U.S. Pat. No. 3,141,746). In the prior art, care is specifically taken so as not to graphitize the diamond starting material as would occur in the diamond unstable region. This is conventionally done by first establishing the pressure conditions well within the diamond stable region on the phase diagram of carbon and thereafter raising the temperature. The pressures involved frequently range above 70,000 atmospheres and temperatures between about 1600°C and 1750°C are often required in prior art processes.

Since extreme pressures are relatively difficult to attain and require expensive and sophisticated equipment, any reduction in the pressure requirements of the apparatus would greatly facilitate production of polycrystalline diamond composites.

Accordingly, it would be an advancement in the art to provide a polycrystalline diamond composite characterized by diamond to diamond bonds which is capable of being produced at lower pressure and temperatures, for example those found in the diamond nonstable region. In particular, it would be a considerable improvement in the art to provide a method of producing such a diamond compact.

BRIEF SUMMARY AND OBJECTS OF THE INVENTION

The present invention relates to polycrystalline diamond composites of predetermined configuration and method for producing same, the composite being characterized by diamond to diamond bonds between adjacent diamond particles, voids therebetween being substantially filled with nondiamond sintering aid.

It is, therefore, an object of this invention to provide improvements in polycrystalline diamond composites.

It is another object of this invention to provide improvements in polycrystalline diamond composites wherein diamond to diamond bonds are created between adjacent diamond particles under temperature and pressure conditions in which diamond is unstable.

It is an even further object of this invention to provide unitary polycrystalline diamond composites of predetermined configuration having diamond to diamond bonds between the adjacent diamond particles and wherein the voids between the diamond particles are filled with a nondiamond sintering aid.

These and other objects and features of the present invention will become more fully apparent from the following description and appended claims taken in conjunction with the accompanying drawing.

DETAILED DESCRIPTION OF THE PREFERRED EMBODIMENTS

The invention is best understood by reference to the figures wherein like parts are designated with like numerals throughout.

This invention is directed toward the process of forming diamond composites using a unique sintering process. Sintering in this specification means forming diamond dust, diamond powder or more coarse diamond particles into a unitary diamond lattice characterized by direct diamond to diamond fusion under conditions of high temperature and pressure. Particulate diamond is defined herein to mean diamond dust, diamond powder or larger diamond fragments, whether naturally or synthetically created.

Figure 1:
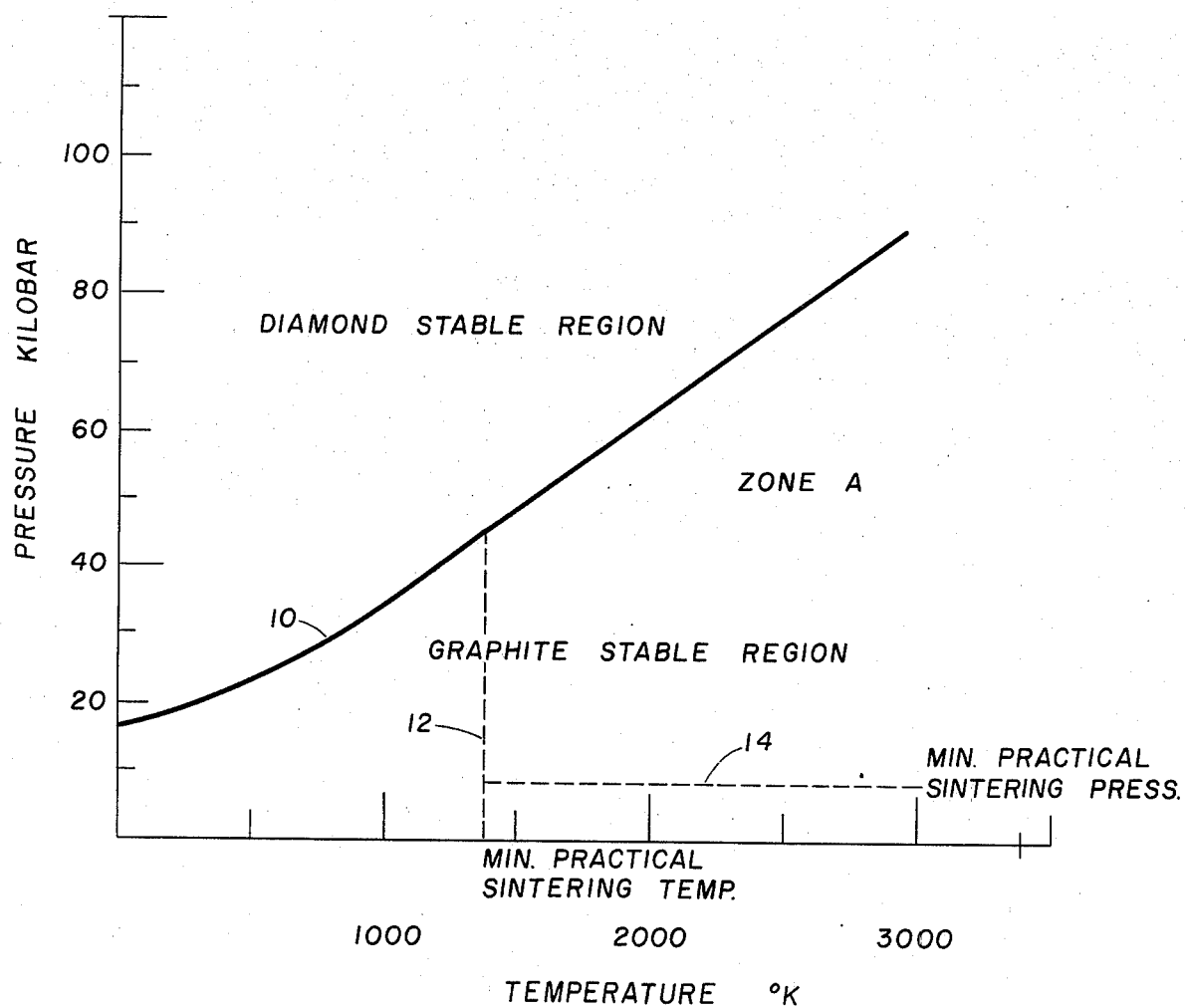
FIG. 1 is a graphical representation of the carbon phase diagram illustrating specifically pressure-temperature conditions under which diamond is unstable.

The process of sintering diamond is known in the art. See, for example, H. T. Hall, "Sintered Diamond, a Synthetic Carbonado," Vol. 169 Science, p. 868, Aug. 28, 1970, and U.S. Pat. No. 3,574,580. Historically, it has been essential to form diamond compacts within diamond stable region of FIG. 1. FIG. 1 is a graphical representation of the pressure-temperature zones in which diamond is stable and in which diamond normally reverts to graphite. Line 10 in FIG. 1 is the thermodynamic equilibrium line, calculated and experimental, for the diamond-graphite system. Above line 10, carbon is stable as diamond and below line 10, graphite is the stable form. The minimum stabilization pressure at any given temperature, line 10, may vary somewhat from that given by the graph since it depends to a certain extent on the size, purity, and surface characteristics of the diamond particles present in the powder and also on the nature of the sintering aid.

Line 12 represents the approximate minimum temperature at which sintering takes place. It should be pointed out that the position of line 12 represents the temperature at which sintering takes place at a sufficiently rapid rate to make it economical. While line 12 may represent a lower temperature, sintering may take place so slowly as to be impractical. Time for satisfactory sintering is reduced as temperature increases. Accordingly, line 12 could be situated at a higher temperature which would have the effect of decreasing the sintering time.

Line 14 in FIG. 1 represents the approximate minimum pressure region in which diamond sintering will take place. The actual minimum pressure required for sintering varies somewhat with the size of the article. The area identified as zone A defined by lines 10, 12 and 14 represents suitable sintering conditions for forming a diamond compact by sintering diamond powder according to this invention.

Accordingly, the present invention is directed toward producing the polycrystalline diamond composites of this invention by subjecting the composite to temperatures and pressures within the range represented by zone A.

Diamond powders useful in practicing the present invention can be natural in origin or may be produced by any suitable conventional method. While a relatively uniform size distribution of the diamond particles is preferred, a mixture of various particle types, sizes, and shapes may be utilized. The particles may contain minor amounts of nondiamond carbon.

In order to produce a polycrystalline diamond composite according to the present invention, it is preferred that the diamond particles be sintered at a temperature-pressure condition falling within zone A as shown in the drawing. A particular advantage of the present invention is that a polycrystalline product can be made under less drastic conditions and in a shorter time interval than heretofore.

Since the method of the present invention is effected under conditions of temperature and pressure wherein the diamond form of carbon is unstable with respect to graphite, a portion of the diamond carbon initially present changes or attempts to revert to the nondiamond carbon form. Thus, the resultant nondiamond carbon containing composites of the present invention range from gray to generally black in color and are electroconductive. The hardness, abrasiveness, electroconductivity and related properties of these composites can be suitably varied by controlling their nondiamond content and thus tailoring them to their intended uses.

The amounts of nondiamond carbon present in the composites may be affected by combining the diamond particles with sintering aids selected from the list of metals consisting of aliminum, beryllium, hafnium, magnesium, molybdenum, niobium, rhenium, titanium, tungsten, and zirconium. Other suitable sintering aids have been found to be boron, nitrogen and silicon. Included in this list of sintering aids are the refractory borides, carbides, nitrides, oxides, and silicides.

Although the participation of the above sintering aids in the sintering reaction is not clearly understood, one hypothesis is that these sintering aids may act as scavengers to remove oxygen and/or hydrogen or other substances which may be present on the surface of the diamond particles which would tend to hinder the sintering of the diamond particles together to form direct diamond to diamond bonds. Both oxygen and hydrogen appear to hinder the foregoing sintering step. These sintering aids also may interreact chemically or physically with the diamond particles to promote sintering in zone A (FIG. 1) or non-stable region for diamond. One possible explanation is that these sintering aids may partially, at least, remove graphite which may form from the decomposition of the diamond carbon. In other words, the sintering aids may act as "anticatalysts" or poisons for hindering the conversion of diamond carbon to nondiamond carbon or graphite.

The proportion of sintering aid relative to the amount of diamond is not particularly critical. However, better bonding is effected when the amount of sintering aid present in the final compact does not exceed 50% by volume. The amount of sintering aid is preferably such that the final compact is firmly bonded with diamond to diamond bonds throughout and the voids between the diamond particles filled without an excess of sintering aid substance being present since excess sintering aid will unnecessarily dilute or diminish the intrinsic properties of diamond bonded to diamond that is desirable to preserve in the compact.

It should be noted that specifically excluded from the foregoing list of sintering aids for sintering diamond to diamond in the thermodynamically unstable region are metals and alloys which act as catalyst-solvents for the massive conversion of diamond to graphite. These include iron, nickel, cobalt and platinum and alloys of the same.

Strength and abrasive qualities of the compact may be further enhanced by including therein a sintering aid which also has desirable abrasive qualities. This, coupled with a reduction in the porosity of the compact by filling substantially all of the voids between the bonded diamond particles with the sintering aid, provides a compact of exceptional qualities and which is produced at substantially lower pressures. The particle size of the diamond and hard abrasive sintering aids used in the practice of this invention are not critical. However, better results are obtained when the sintering aid particle size is equal to or smaller than the diamond particle size.

It is apparent that, even though lower pressures are used when operating in the non-stable temperature and pressure area, certain specialized equipment capable of generating and withstanding the necessary operating temperatures and pressures is required to practice the present invention. Apparatus such as that described in my earlier U.S. Pat. Nos. 2,918,699 (the tetrahedral press), 2,941,248 (the belt), 3,159,876 (prismatic press), and particularly a cubic press of the type illustrated in FIG. 2 which is commercially available from McCartney Manufacturing Co. of Baxter Springs, Kan., are useful for this purpose.

Figure 2:
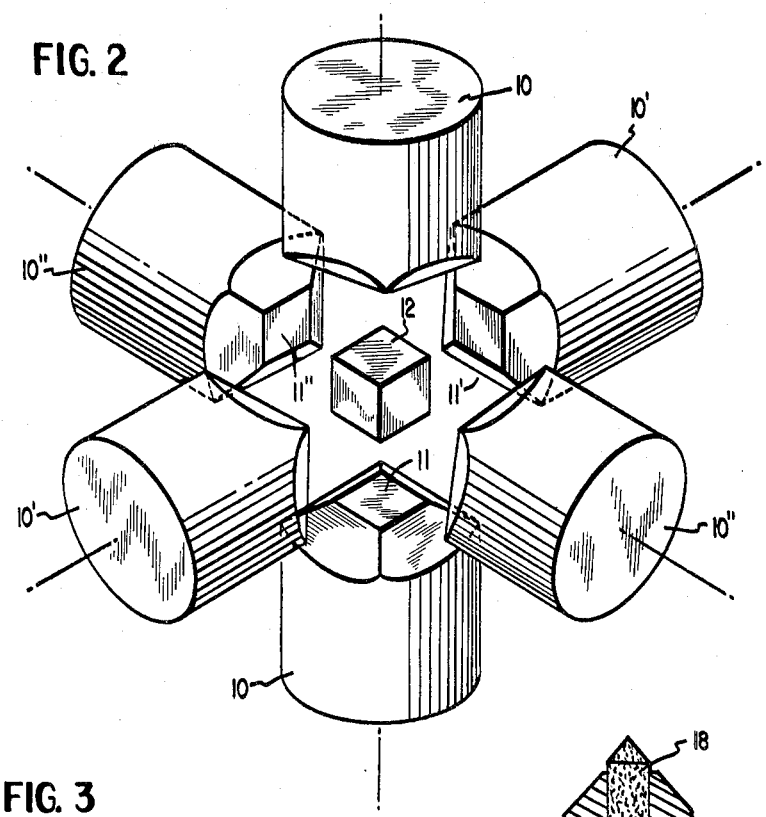
FIG. 2 is a schematic view of a suitable apparatus and cell for obtaining the unitary diamond composite according to a presently preferred embodiment of the invention.
Figure 3:
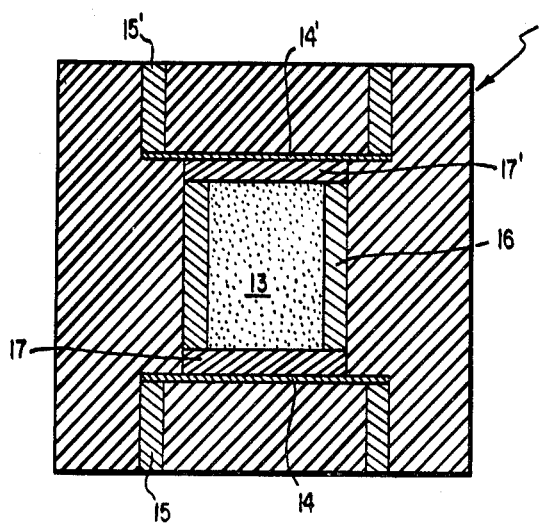
FIG. 3 is a sectional view of the cell shown in FIG. 2.
Figure 4:
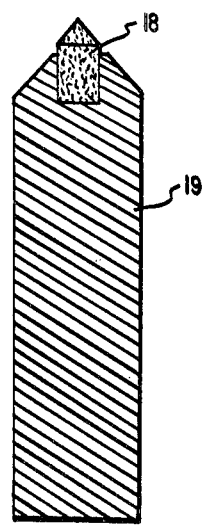
FIG. 4 is a representation of a unitary shaped polycrystalline diamond composite tool made by the method of the invention.

Reference is now made to FIGS. 2–4 directed toward the presently preferred process embodiment of the invention. Sintering takes place within a sample cube 12 illustrated in FIGS. 2 and 3. The sample cube 12 is preferably made of pyrophyllite and is illustrated in longitudinal cross-section in FIG. 3. Sample cube 12 is designed for use in the cubic press which is now described.

The cubic press consists of six tungsten carbide anvils, in matching pairs 10, 10' and 10", with equal area square faces 11 and 45° sloping shoulders. The anvils, electrically insulated from each other, are aligned for rectilinear movement along three mutually perpendicular coordinate axes and synchronized in their motion by an anvil guide mechanism as described in my U.S. Pat. No. 3,182,353. Each anvil is attached to and powered by support apparatus (not shown) including a double acting hydraulic ram affixed to a base; the bases are fastened together by an arrangement of twelve tierods forming the outline of a regular hexahedron. The thrust of the six rams simultaneously moves the synchronized anvils 10 toward the symmetry center of the press about a cube-shaped pyrophyllite cell 12 having square faces approximately 60% greater in area than the anvil faces and parallel to the corresponding anvil faces. Further advance of the anvils extrudes and compresses pyrophyllite between the 45° sloping shoulders of the anvils generating pressure within the cell 12. This pressure is transmitted to the sample 13 undergoing sintering in a sample container 16 with end caps 17 usually also serving as an electrical resistance heating element and in electrical contact with the anvil.

The following non-limiting examples were run in a cubic press having anvils ½ inch on edge and are illustrative of my method.

EXAMPLE 1

Importantly, the bonded diamond compact of this invention may be sintered into a unitary, coherent compact having a final desired configuration 18, for example, which may then be mounted in a holder 19 to thereby serve as an abrasive wheel dressing tool. This example is for illustrative purposes only since there are many possible desired configurations for the compact produced by following the teachings of this invention.

A cubic press with anvils ½ inch on edge was used and the sample container 16 was a graphite tube 5/16 inch long and 3/16 inch in diameter. Sample container 16 was filled with less than 1 micron size diamond powder and silicon powder as a sintering aid. The pressure was brought to 55 kilobars and then the temperature raised to about 2200°K for about 20 seconds. A 60 cycle, single phase, alternating current was passed from one anvil successively through a steel current ring 15, molybdenum current disc 14, graphite end cap 17, graphite tube 16, graphite end cap 17′, molybdenum current disc 14′ and steel current ring 15′ to the opposite anvil face. The relatively high electrical resistance of the graphite and the molybdenum current discs caused these components to heat up quickly and within seconds transfer their heat to the diamond particles 13 undergoing sintering. Heating was discontinued, the system cooled and the pressure released. A black electroconductive composite was removed from the sample container.

In the examples which follow all sample runs were also conducted in the above described cubic press. The specimen was contained in a grpahite tube 16 having an outside diameter of about 3/16 inch and a wall thickness of 0.020 inch. Each tube was ¼ inch long with 0.40 inch thick Graphite caps 17 having a diameter of 3/16 inch and were placed at the ends of the tube.

EXAMPLE 2

Nitrogen as a sintering aid was obtained by the decomposition of a sodium nitride disc which was placed in one end of the graphite tube. The remainder of the tube was filled with natural diamond particles consisting of a powder having a particle size within the range of 1–5 microns. The specimen was subjected to a pressure of approximately 65 kilobars and a temperature of approximately 2283°C for a period of about 120 seconds. Upon removal from the cubic press, the specimen proved to be a moderately strong cylinder having a white appearance and consisting of sintered diamond particles.

EXAMPLE 3

A specimen was prepared from equal volumes of hexagonal boron nitride powder and natural diamond powder (particle size 1–5 microns) which was intimately mixed and compacted into the above described graphite tube. The specimen was subjected to a pressure of about 65 kilobars and a temperature of about 2313°K for 600 seconds and produced a sintered diamond product which was tough, hard and held a keen edge. The color of the composite was grayish in appearance.

EXAMPLE 4

Boron as the sintering aid was mixed with diamond particles on the basis of 25 volume % 1 micron boron particles and 75 volume % 1–5 micron diamond particles intimately mixed and placed into the graphite tube. The specimen was reacted in the non-stable diamond region at a pressure of approximately 65 kilobars and a temperature of approximately 2200°K for a period of about 10 seconds. A polycrystalline diamond product having diamond to diamond bonds was produced having excellent toughness and hardness characteristics and black in appearance.

EXAMPLE 5

Aluminum oxide as the sintering aid was mixed on the basis of 29 weight % (5 micron size aluminum particles) with the balance of the specimen comprising 1–5 micron diamond particles. The mixture was intimately mixed and placed into the graphite specimen tube. After a period of about 10 seconds at a pressure of approximately 65 kilobars and a temperature of approximately 2300°K, a product which was white in appearance and which was very strong and coherent was produced.

EXAMPLE 6

Silicon carbide on the basis of 25 weight % (1,000 grit silicon carbide) with the balance being made up of 1–5 micron size diamond particles was mixed as previously described and placed into the graphite sample tube. The specimen was subjected to a pressure of about 65 kilobars and a temperature of about 2300°K for about 10 seconds and resulted in a specimen which was black in color and was very hard and strong.

EXAMPLE 7

Magnesium oxide was mixed with diamond particles on the basis of 29 weight % very fine magnesium oxide with the balance comprising 1–5 micron diamond particles. After a 30 second treatment at a pressure of about 65 kilobars and a temperature of about 2300°K, a white appearing, very strong, coherent, sintered cylinder of polycrystalline diamond particles was produced.

EXAMPLE 8

Titanium boride was mixed with diamond powder on the basis of 33 weight % fine titanium boride powder with 1–5 micron size diamond powder. A black appearing, strong, coherent, very hard cylinder of polycrystalline diamond composite was obtained after about 10 seconds at a pressure of about 65 kilobars and a temperature of 2400°K.

EXAMPLE 9

Tungsten carbide as a sintering aid was mixed on the basis of 66 weight % tungsten carbide (less than 5 micron size) and 33 weight % 1–5 micron diamond powder. A black hard tough cylindrical specimen was obtained after 13 seconds at a pressure of about 65 kilobars and a temperature of about 2300°K.

EXAMPLE 10

Metallic aluminum was used as the sintering aid on the basis of a 2% by weight fine aluminum powder and 98 weight % 1–5 micron diamond powder. The specimen was black in color, hard, tough, and a coherent cylinder after about 6 seconds at a pressure of about 65 kilobars and a temperature of about 2400°K.

In each of the foregoing experiments, operation in the desired pressure and temperature region, zone A, was verified through the use of a very fine wire formed of a metal such as platinum, nickel, or other known solventcatalyst metal. Operation in the diamond stable region will cause the metal of the wire to catalyze the reaction from graphite to form diamond. The reverse is true in zone A at pressures and temperatures in the diamond non-stable region where the metal of the wire will catalyze the conversion of diamond to graphite. Accordingly, by the insertion of a very small piece of the wire into the sample 13, a small portion of the composite surrounding the wire was converted to graphite. Thus, it was established that the composites were made under pressuretemperature conditions in which diamond is unstable.

The polycrystalline product of the present invention is a unitary shaped composite conforming to the shape of the mold in which it is prepared. My method avoids the tedious steps of cutting, polishing and the like required to shape natural material. Composites according to the present invention have been made in various desired configurations including some hollow central portions. In each of the polycrystalline composites produced by my invention, they have been found to have diamond to diamond bonds between adjacent diamond particles thus giving the polycrystalline diamond product exceptional strength and hardness.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A diamond-nondiamond carbon polycrystalline composite consisting essentially of 50–99% by weight of diamond particles which are sintered to adjacent diamond particles forming diamond to diamond bonds and graphite and sintering aid in a combined amount of about 50–1% by weight interspersed in voids between the sintered diamond particles, the nondiamond carbon reverting from diamond carbon by exposing the diamond carbon to temperature and pressure conditions in which diamond is unstable.

2. A polycrystalline diamond composite as defined in claim 1 wherein said sintering aid comprises at least one element selected from the group consisting of aluminum, beryllium, boron, hafnium, magnesium, molybdenum, niobium, nitrogen, rhenium, silicon, titanium, tungsten, vanadium, and zirconium.

3. A polycrystalline diamond composite as defined in claim 1 wherein said sintering aid comprises at least one refractory selected from the group consisting of refractory borides, carbides, nitrides, oxides and silicides.

4. A method for making a diamond-nondiamond carbon polycrystalline composite consisting essentially of 50–99% by weight of diamond and 50–1% by weight of graphite and sintering aid which comprises sintering together initially distinct diamond particles by subjecting a mixture of diamond particles and sintering aid to a condition of pressure and temperature in which the diamond is simultaneously (a) thermodynamically unstable with respect to graphite and (b) capable of sintering and for a time increment less than that resulting in conversion of the diamond in the polycrystalline composite to below 50% by weight.

5. A method as defined in claim 4 wherein said sintering aid comprises at least one element selected from the group consisting of aluminum, beryllium, boron, hafnium, magnesium, molybdenum, niobium, nitrogen, rhenium, silicon, titanium, tungsten, vanadium, and zirconium.

6. A method as defined in claim 4 wherein said sintering aid comprises at least one refractory selected from the group consisting of refractory borides, carbides nitrides, oxides, and silicides.

7. A method for making a diamond-nondiamond carbon polycrystalline compact which comprises heating initially distinct diamond particles and at least one sintering aid under a pressure between about five kilobars and about 100 kilobars and at a temperature at which diamond is thermodynamically unstable under such pressure with respect to conversion to graphite until from 1% to 50% of the diamond is converted to nondiamond carbon.

8. A method of bonding diamond to diamond to form a polycrystalline diamond composite comprising the steps of:
  forming an intimate mixture of diamond particles and a sintering aid;
  subjecting the mixture to temperature and pressure conditions in which diamond is unstable until a unitary composite of predetermined configuration is formed, said unitary composite comprising direct diamond to diamond bonds uniting diamond particles, voids therebetween being filled with graphite and sintering aid.

* * * * *